(12) United States Patent
Harel

(10) Patent No.: US 10,181,906 B1
(45) Date of Patent: Jan. 15, 2019

(54) GAIN LEVEL CONTROL CIRCUIT SUPPORTING DYNAMIC GAIN CONTROL IN A WIRELESS COMMUNICATIONS SYSTEM (WCS)

(71) Applicant: Corning Optical Communications Wireless Ltd, Airport (IL)

(72) Inventor: Dror Harel, Hod Hasharon (IL)

(73) Assignee: Corning Optical Communications Wireless Ltd, Airport (IL)

(*) Notice: Subject to any disclaimer, the term of this patent is extended or adjusted under 35 U.S.C. 154(b) by 0 days.

(21) Appl. No.: 15/926,364

(22) Filed: Mar. 20, 2018

(51) Int. Cl.
*H04B 10/00* (2013.01)
*H04B 10/294* (2013.01)
*H04B 10/2575* (2013.01)

(52) U.S. Cl.
CPC ... *H04B 10/2942* (2013.01); *H04B 10/25753* (2013.01); *H04B 10/25759* (2013.01)

(58) Field of Classification Search
CPC .......... H04B 10/2942; H04B 10/25753; H04B 10/25759
USPC ......................................................... 398/115
See application file for complete search history.

(56) References Cited

U.S. PATENT DOCUMENTS

| 8,149,964 | B2* | 4/2012 | Sidi | H03G 1/04 |
| | | | | 375/345 |
| 8,548,330 | B2* | 10/2013 | Berlin | H04B 10/25753 |
| | | | | 398/115 |
| 8,908,607 | B2 | 12/2014 | Kummetz et al. | |
| 9,078,218 | B1* | 7/2015 | Harel | H04B 17/12 |
| 9,420,542 | B2* | 8/2016 | Henia | H04B 10/25753 |

* cited by examiner

*Primary Examiner* — M. R. Sedighian
(74) *Attorney, Agent, or Firm* — C. Keith Montgomery

(57) ABSTRACT

A gain level control circuit in a wireless distribution system (WDS) is provided. The digital level control circuit receives a number of first digital communications signals having a number of first digital amplitudes and generates a number of second digital communications signals having a number of second digital amplitudes. When a selected second digital amplitude approaches a full-scale digital amplitude represented by a predefined number of binary bits, the gain level control circuit determines a selected first digital communications signal having a selected first digital amplitude causing the selected second digital amplitude to exceed the full-scale digital amplitude and adjusts the selected first digital amplitude to reduce the selected second digital amplitude to lower than or equal to the full-scale digital amplitude. As such, it is possible to overcome digital amplitude clipping without increasing the predefined number of binary bits, thus achieving a calculated balance between performance, complexity, and cost.

28 Claims, 10 Drawing Sheets

GAIN LEVEL CONTROL CIRCUIT SUPPORTING DYNAMIC GAIN CONTROL IN A WIRELESS COMMUNICATIONS SYSTEM (WCS)

BACKGROUND

The disclosure relates generally to wireless communications systems (WCSs), such as wireless distributed systems (WDSs), distributed antenna systems (DASs), remote radio head (RRH) systems, and small radio cell systems, and more particularly to supporting dynamic power control in a WCS.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of WDSs. Examples of WDSs include DASs, RRH systems, and small radio cell systems (e.g., femtocells systems). WDSs include remote units configured to receive and transmit downlink communications signals to client devices within the antenna range of the respective remote units. WDSs can be particularly useful when deployed inside buildings or other indoor environments where the wireless communication devices may not otherwise be able to effectively receive radio frequency (RF) signals from a source.

In this regard, FIG. 1 illustrates a wireless distributed system (WDS) 100 that is configured to distribute communications services to remote coverage areas 102(1)(1)-102(M)(N), where 'N' is the number of remote coverage areas. The WDS 100 can be configured to support a variety of communications services that can include cellular communications services, wireless communications services, such as RF identification (RFID) tracking, WiFi, local area network (LAN), wireless LAN (WLAN), and wireless solutions (Bluetooth, WiFi Global Positioning System (GPS) signal-based, and others) for location-based services, and combinations thereof, as examples. For example, the WDS 100 may be a DAS or an RRH system. The remote coverage areas 102(1)(1)-102(M)(N) are created by and centered on remote units (RUs) 104(1)(1)-104(M)(N) connected to a head-end unit (HEU) 106. The remote units 104(1)(1)-104(M)(N) are shown arranged in rows '1-M,' each with columns '1-N' for convenience, and are located in a building 108 or in an area of the building 108. The HEU 106 may be communicatively coupled to a base transceiver station (BTS) or a baseband unit (BBU). The HEU 106 receives downlink communications signals 112D from the BTS and/or the BBU to be communicated to the remote units 104(1)(1)-104(M)(N). The downlink communications signals 112D are communicated by the HEU 106 over a communications link 114 to the remote units 104(1)(1)-104(M)(N). The remote units 104(1)(1)-104(M)(N) are configured to receive the downlink communications signals 112D from the HEU 106 over the communications link 114. The remote units 104(1)(1)-104(M)(N) may include an RF transmitter/receiver (not shown) and a respective antenna operably connected to the RF transmitter/receiver to wirelessly distribute the communications services to user equipment (UE) 116 within their respective remote coverage areas 102(1)(1)-102(M)(N). The remote units 104(1)(1)-104(M)(N) are also configured to receive uplink communications signals 112U from the UE 116 in their respective remote coverage areas 102(1)(1)-102(M)(N) to be communicated to the HEU 106.

With continuing reference to FIG. 1, each of the remote units 104(1)(1)-104(M)(N) may receive multiple uplink communications signals 112U in multiple frequency bands. In this regard, each remote unit may first combine the multiple uplink communications signals 112U into a combined uplink communications signal and then convert the combined uplink communications signal into a digital uplink communications signal for transmission to the HEU 106 over the communications link 114. The HEU 106 may need to split and recombine (e.g., based on the frequency bands) the uplink communications signals 112U received from the remote units 104(1)(1)-104(M)(N) to generate a number of combined digital communications signals for distribution to a number of signal sources (e.g., service providers). As such, each of the combined digital communications signal can have a digital amplitude represented by a predefined number of binary bits. For example, if the predefined number of binary bits equals ten (10), then the digital amplitude can have up to 1,024 ($2^{10}$) different values.

Notably, it is possible to represent more digital amplitudes by increasing the predefined number of binary bits. However, increasing the predefined number of binary bits can also result in increased processing complexity and overhead, thus leading to increased hardware and/or software costs in the HEU 106. As such, it may be desirable to represent the digital amplitudes based on a reasonable number of binary bits help control hardware and/or software costs in the HEU 106.

No admission is made that any reference cited herein constitutes prior art. Applicant expressly reserves the right to challenge the accuracy and pertinency of any cited documents.

SUMMARY

Embodiments of the disclosure relate to a gain level control circuit in a wireless communications system (WCS), such as a wireless distribution system (WDS). In examples discussed herein, the gain level control circuit can be employed to support dynamic gain control in a head-end unit (HEU) and/or a digital routing unit (DRU) in the WCS. The digital level control circuit receives a number of first digital communications signals having a number of first digital amplitudes and generates a number of second digital communications signals having a number of second digital amplitudes. Given that each of the second digital communications signals can be a combined digital signal including a selected number of the first digital communications signals, each of the second digital amplitudes represents an aggregated digital amplitude of the selected number of first digital communications signals. Notably, the predefined number of binary bits can only represent up to a full-scale digital amplitude before becoming overflown and causing a digital amplitude clipping in the aggregated digital amplitude. In this regard, when a selected second digital amplitude approaches the full-scale digital amplitude, the gain level control circuit determines a selected first digital communications signal among the selected number of first digital communications signals having a selected first digital amplitude causing the selected second digital amplitude to approach the full-scale digital amplitude and adjust the selected first digital amplitude to reduce the selected second digital. By performing dynamic gain control based on the aggregated digital amplitude, it is possible to overcome the digital amplitude clipping without increasing the predefined number of binary bits, thus helping to achieve a calculated balance between performance, complexity, and cost in the gain level control circuit.

In one exemplary aspect, a gain level control circuit is in a WCS. The gain level control circuit includes a digital signal distribution circuit comprising a plurality of digital signal inputs and a plurality of digital signal outputs. The digital signal distribution circuit is configured to receive a plurality of first digital communications signals having a plurality of first digital amplitudes from the plurality of digital signal inputs, respectively. The digital signal distribution circuit is also configured to generate a plurality of second digital communications signals having a plurality of second digital amplitudes at the plurality of digital signal outputs based on the plurality of first digital communications signals. Each of the plurality of second digital amplitudes is represented up to a full-scale digital amplitude in a predefined number of binary bits. The gain level control circuit also includes a digital signal processing circuit coupled to the plurality of digital signal inputs. The digital signal processing circuit is configured to determine that a selected second digital communications signal among the plurality of second digital communications signals has a selected second digital amplitude among the plurality of second digital amplitudes approaching the full-scale digital amplitude that can be represented by the predefined number of binary bits. The digital signal processing circuit is also configured to determine a selected first digital communications signal among the plurality of first digital communications signals having a selected first digital amplitude causing the selected second digital amplitude to approach the full-scale digital amplitude. The digital signal processing circuit is also configured to control the digital signal distribution circuit to adjust the selected first digital amplitude to reduce the selected second digital amplitude.

An additional embodiment of the disclosure relates to a method for supporting dynamic gain control in in a WCS. The method includes receiving a plurality of first digital communications signals having a plurality of first digital amplitudes, respectively. The method also includes generating a plurality of second digital communications signals having a plurality of second digital amplitudes based on the plurality of first digital communications signals. Each of the plurality of second digital amplitudes is represented up to a full-scale digital amplitude in a predefined number of binary bits. The method also includes determining that a selected second digital communications signal among the plurality of second digital communications signals has a selected second digital amplitude among the plurality of second digital amplitudes approaching the full-scale digital amplitude that can be represented by the predefined number of binary bits. The method also includes determining a selected first digital communications signal among the plurality of first digital communications signals having a selected first digital amplitude causing the selected second digital amplitude to approach the full-scale digital amplitude. The method also includes adjusting the selected first digital amplitude to reduce the selected second digital amplitude.

An additional embodiment of the disclosure relates to an HEU in a WCS. The HEU includes a gain level control circuit. The gain level control circuit includes a digital signal distribution circuit comprising a plurality of digital signal inputs and a plurality of digital signal outputs. The digital signal distribution circuit is configured to receive a plurality of first digital communications signals having a plurality of first digital amplitudes from the plurality of digital signal inputs, respectively. The digital signal distribution circuit is also configured to generate a plurality of second digital communications signals having a plurality of second digital amplitudes at the plurality of digital signal outputs based on the plurality of first digital communications signals. Each of the plurality of second digital amplitudes is represented up to a full-scale digital amplitude in a predefined number of binary bits. The gain level control circuit also includes a digital signal processing circuit coupled to the plurality of digital signal inputs. The digital signal processing circuit is configured to determine that a selected second digital communications signal among the plurality of second digital communications signals has a selected second digital amplitude among the plurality of second digital amplitudes approaching the full-scale digital amplitude that can be represented by the predefined number of binary bits. The digital signal processing circuit is also configured to determine a selected first digital communications signal among the plurality of first digital communications signals having a selected first digital amplitude causing the selected second digital amplitude to approach the full-scale digital amplitude. The digital signal processing circuit is also configured to control the digital signal distribution circuit to adjust the selected first digital amplitude to reduce the selected second digital amplitude.

An additional embodiment of the disclosure relates to DRU in a WCS. The DRU includes a gain level control circuit. The gain level control circuit includes a digital signal distribution circuit comprising a plurality of digital signal inputs and a plurality of digital signal outputs. The digital signal distribution circuit is configured to receive a plurality of first digital communications signals having a plurality of first digital amplitudes from the plurality of digital signal inputs, respectively. The digital signal distribution circuit is also configured to generate a plurality of second digital communications signals having a plurality of second digital amplitudes at the plurality of digital signal outputs based on the plurality of first digital communications signals. Each of the plurality of second digital amplitudes is represented up to a full-scale digital amplitude in a predefined number of binary bits. The gain level control circuit also includes a digital signal processing circuit coupled to the plurality of digital signal inputs. The digital signal processing circuit is configured to determine that a selected second digital communications signal among the plurality of second digital communications signals has a selected second digital amplitude among the plurality of second digital amplitudes approaching the full-scale digital amplitude that can be represented by the predefined number of binary bits. The digital signal processing circuit is also configured to determine a selected first digital communications signal among the plurality of first digital communications signals having a selected first digital amplitude causing the selected second digital amplitude to approach the full-scale digital amplitude. The digital signal processing circuit is also configured to control the digital signal distribution circuit to adjust the selected first digital amplitude to reduce the selected second digital amplitude.

An additional embodiment of the disclosure relates to a WDS. The WDS includes a plurality of remote units. The WDS also includes an HEU coupled to the plurality of remote units via a plurality of communications mediums, respectively. The HEU is configured to distribute a plurality of downlink communications signals to the plurality of remote units via the plurality of communications mediums, respectively. The HEU is also configured to receive a plurality of uplink communications signals from the plurality of remote units via the plurality of communications mediums, respectively. The HEU includes a gain level control circuit. The gain level control circuit includes a digital signal distribution circuit comprising a plurality of digital signal inputs and a plurality of digital signal outputs. The digital signal distribution circuit is configured to receive a plurality of first digital communications signals having a plurality of first digital amplitudes from the plurality of digital signal inputs, respectively. The digital signal distribution circuit is also configured to generate a plurality of second digital communications signals having a plurality of second digital amplitudes at the plurality of digital signal outputs based on the plurality of first digital communications signals. Each of the plurality of second digital amplitudes is represented up to a full-scale digital amplitude in a predefined number of binary bits. The gain level control circuit also includes a digital signal processing circuit coupled to the plurality of digital signal inputs. The digital signal processing circuit is configured to determine that a selected second digital communications signal among the plurality of second digital communications signals has a selected second digital amplitude among the plurality of second digital amplitudes exceeding the full-scale digital amplitude that can be represented by the predefined number of binary bits. The digital signal processing circuit is also configured to determine a selected first digital communications signal among the plurality of first digital communications signals having a selected first digital amplitude causing the selected second digital amplitude to exceed the full-scale digital amplitude. The digital signal processing circuit is also configured to control the digital signal distribution circuit to adjust the selected first digital amplitude to reduce the selected second digital amplitude to lower than or equal to the full-scale digital amplitude.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to a gain level control circuit in a wireless communications system (WCS), such as a wireless distribution system (WDS). In examples discussed herein, the gain level control circuit can be employed to support dynamic gain control in a head-end unit (HEU) and/or a digital routing unit (DRU) in the WDS. The digital level control circuit receives a number of first digital communications signals having a number of first digital amplitudes and generates a number of second digital communications signals having a number of second digital amplitudes. Given that each of the second digital communications signals can be a combined digital signal including a selected number of the first digital communications signals, each of the second digital amplitudes represents an aggregated digital amplitude of the selected number of first digital communications signals. Notably, the predefined number of binary bits can only represent up to a full-scale digital amplitude before becoming overflown and causing a digital amplitude clipping in the aggregated digital amplitude. In this regard, when a selected second digital amplitude approaches the full-scale digital amplitude, the gain level control circuit determines a selected first digital communications signal among the selected number of first digital communications signals having a selected first digital amplitude causing the selected second digital amplitude to approach the full-scale digital amplitude and adjusts the selected first digital amplitude to reduce the selected second digital amplitude. By performing dynamic gain control based on the aggregated digital amplitude, it is possible to overcome the digital amplitude clipping without increasing the predefined number of binary bits, thus helping to achieve a calculated balance between performance, complexity, and cost in the gain level control circuit.

Figure 1:
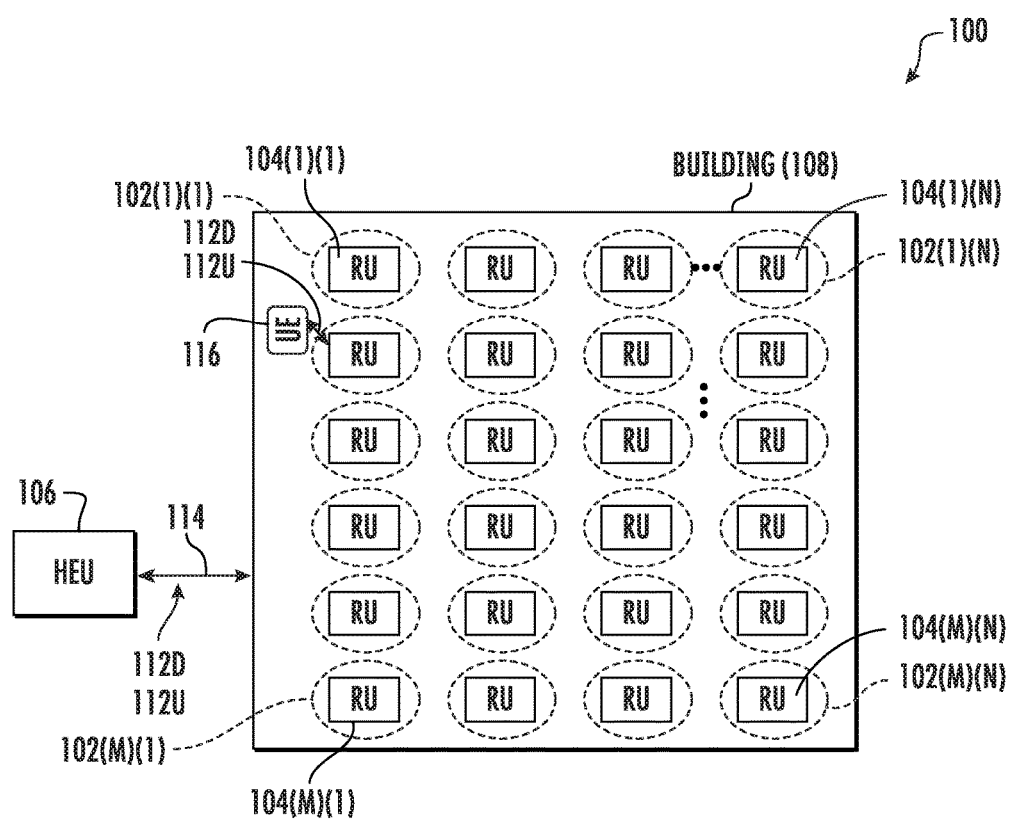
FIG. 1 is a schematic diagram of an exemplary indoor wireless distributed system (WDS) that includes an indoor cell neighboring an outdoor cell.
Figure 2:
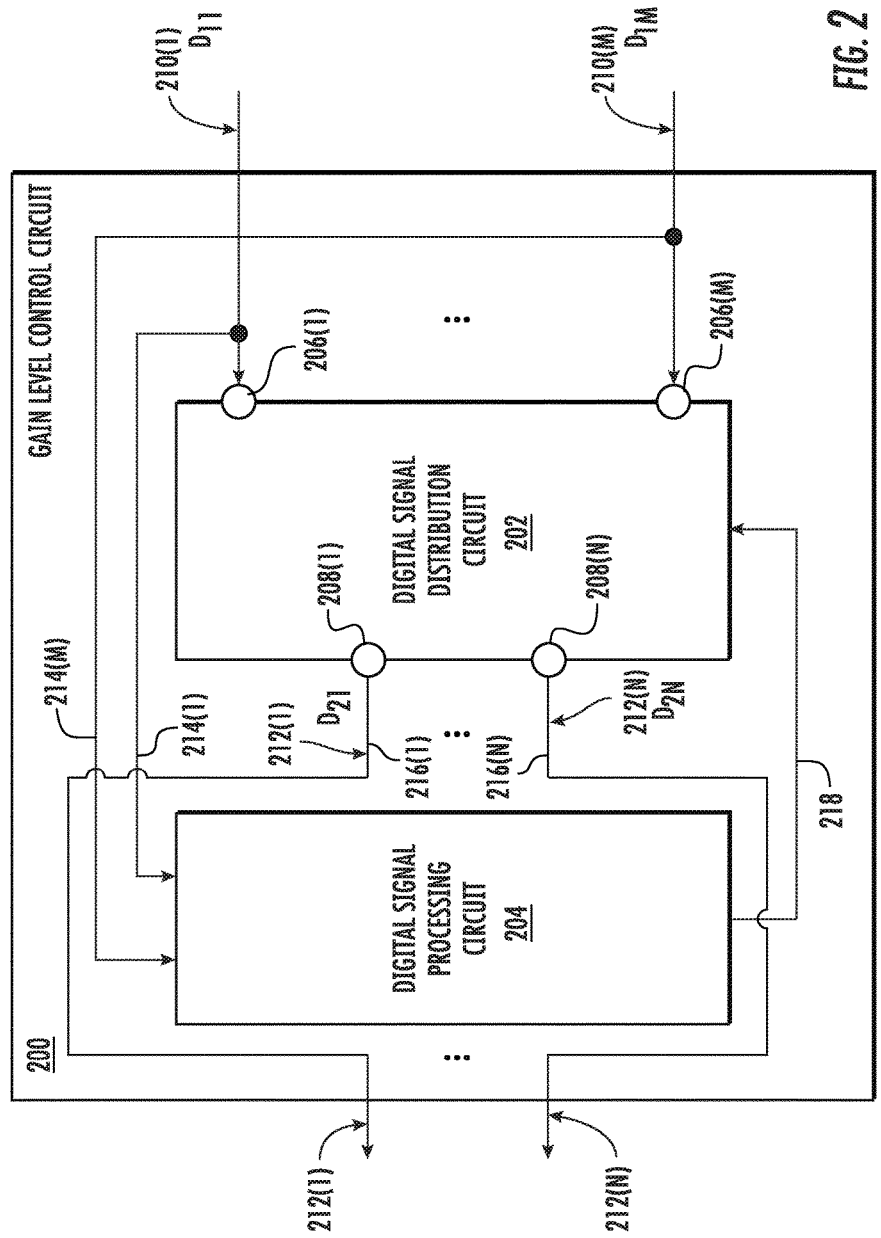
FIG. 2 is a schematic diagram of an exemplary gain level control circuit, which can be provided in a head-end unit (HEU) in a WCS to support dynamic gain control to overcome digital amplitude clipping.

In this regard, FIG. 2 is a schematic diagram of an exemplary gain level control circuit 200, which can be provided in an HEU in a WCS to support dynamic gain control to overcome digital amplitude clipping. In examples discussed herein, a digital signal can have digital amplitude represented in a predefined number of binary bits. For example, if the predefined number of binary bits equals five (5), the predefined number of binary bits can be encoded from binary value 00000 to binary value 11111 to represent thirty-two (32) distinct digital amplitudes. Accordingly, if the binary value 00000 represents a minimum value of the digital amplitude, then the binary value 11111 would represent a maximum value of the digital amplitude, which is hereinafter referred to as "full-scale digital amplitude." If the digital amplitude becomes higher than the full-scale digital amplitude that can be represented by the predefined number of binary bits, the digital amplitude would be reset to binary value 00000. As a result, it would be impossible to determine whether the binary value 00000 actually represents the minimum value of the digital amplitude, or a digital amplitude higher than the full-scale digital amplitude. In this regard, the digital amplitude represented by the predefined number of binary bits is clipped (hereinafter referred to as "digital amplitude clipping").

Although it may be possible to increase the predefined number of binary bits to represent more distinct digital amplitudes, such a measure comes at an expense of increased hardware costs and software complexity in the gain level control circuit 200. Moreover, it may be difficult to predict an exact number of the predefined binary bits to represent all possible digital amplitudes to prevent the digital amplitude clipping from happening. Furthermore, it may also be difficult and costly to perform hardware and/or software upgrades to increase the predefined number of binary bits in the field. Hence, it may be desirable to overcome digital amplitude clipping without changing the predefined number of binary bits.

As discussed in detail below, the gain level control circuit 200 can detect the digital amplitude clipping based on such digital spectrum analysis techniques as Fast Fourier Transform (FFT). In response to detecting the digital amplitude clipping, the gain level control circuit 200 can further determine a selected digital communications signal causing the digital amplitude clipping. Accordingly, the gain level control circuit 200 adjusts a respective digital amplitude of the selected digital communications signal to overcome the digital amplitude clipping. By performing dynamic gain control based on the aggregated digital amplitude, it is possible to overcome the digital amplitude clipping without increasing the predefined number of binary bits, thus helping to achieve a calculated balance between performance, complexity, and cost in the gain level control circuit 200.

With reference to FIG. 2, the gain level control circuit 200 includes a digital signal distribution circuit 202 and a digital signal processing circuit 204. The digital signal distribution circuit 202 includes a plurality of digital signal inputs 206(1)-206(M) and a plurality of digital signal outputs 208(1)-208(N). The digital signal distribution circuit 202 is configured to receive a plurality of first digital communications signals 210(1)-210(M) via the digital signal inputs 206(1)-206(M), respectively. The first digital communications signals 210(1)-210(M) have a plurality of first digital amplitudes respectively. The digital signal distribution circuit 202 is configured to generate a plurality of second digital communications signals 212(1)-212(N) at the digital signal outputs 208(1)-208(N) based on the first digital communications signals 210(1)-210(M). The second digital communications signals 212(1)-212(N) have a plurality of second digital amplitudes $D_{21}$-$D_{2N}$, respectively. Each of the second digital amplitudes $D_{21}$-$D_{2N}$ is represented up to a full-scale digital amplitude in a predefined number of binary bits. For example, if the predefined number of binary bits equals 5, then the full-scale digital amplitude that can be represented by the predefined number of binary bits is binary value 11111.

It should be appreciated that each of the second digital amplitudes $D_{21}$-$D_{2N}$ can be represented by different predefined number of binary bits or identical predefined number of binary bits. Notably, the first digital amplitudes $D_{11}$-$D_{1M}$ may be represented by a respective predefined number of binary bits. Thus, it should also be appreciated that the respective predefined number of binary bits representing the first digital amplitudes $D_{11}$-$D_{1M}$ can be identical to or different from the predefined number of binary bits representing the second digital amplitudes $D_{21}$-$D_{2N}$.

The digital signal processing circuit 204 is coupled to the digital signal inputs 206(1)-206(M) via a plurality of input signal links 214(1)-214(M), respectively. The digital signal outputs 208(1)-208(N) are coupled to a plurality of output signal links 216(1)-216(N), respectively. The digital signal processing circuit 204 is further coupled to the digital signal distribution circuit 202 via a control link 218.

The digital signal processing circuit 204 is configured to determine that a selected second digital communications signal among the second digital communications signals 212(1)-212(N) has a selected second digital amplitude among the second digital amplitudes $D_{21}$-$D_{2N}$ exceeding the full-scale digital amplitude that can be represented by the predefined number of binary bits. Accordingly, the digital signal processing circuit 204 further determines that a selected first digital communications signal among the first digital communications signals 210(1)-210(M) has a selected first digital amplitude among the first digital amplitudes $D_{11}$-$D_{1M}$ causing the selected second digital amplitude to exceed the full-scale digital amplitude represented by the predefined number of binary bits. Thus, the digital signal processing circuit 204 controls the digital signal distribution circuit 202 to adjust (e.g., reduce) the selected first digital amplitude (e.g., in one or more corrective iterations) to reduce the selected second digital amplitude to lower than or equal to the full-scale digital amplitude that can be represented by the predefined number of binary bits. By performing dynamic gain control on the selected first digital amplitude, it is possible to overcome the digital amplitude clipping in the selected second digital amplitude without increasing the predefined number of binary bits, thus helping to achieve a calculated balance between performance, complexity, and cost in the gain level control circuit 200.

The gain level control circuit 200 may be configured to support dynamic gain control to overcome digital amplitude clipping based on a process. In this regard, FIG. 3 is a flow chart of an exemplary process 300, which can be employed by the gain level control circuit 200 of FIG. 2 to support dynamic gain control to overcome digital amplitude clipping.

Figure 3:
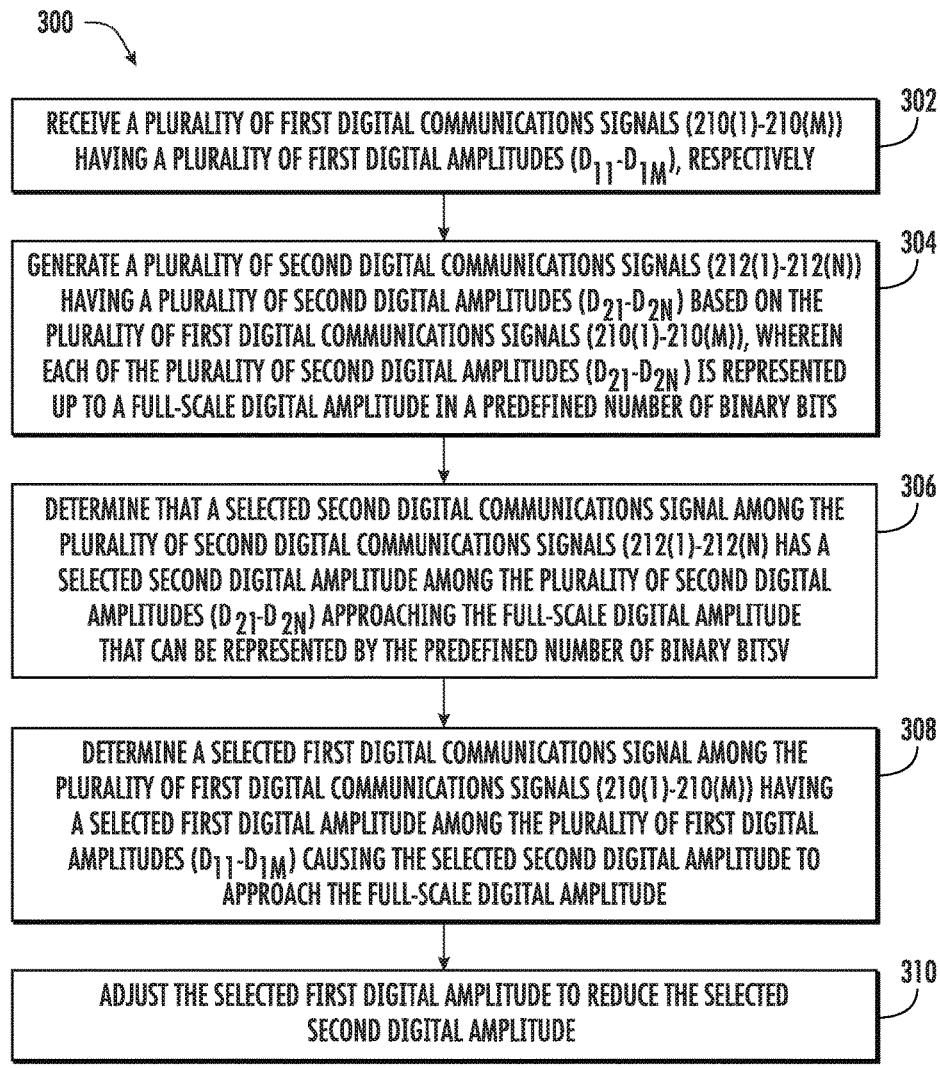
FIG. 3 is a flow chart of an exemplary process, which can be employed by the gain level control circuit of FIG. 2 to support dynamic gain control to overcome digital amplitude clipping.

With reference to FIG. 3, the gain level control circuit 200 receives the first digital communications signals 210(1)-210(M) having the first digital amplitudes $D_{11}$-$D_{1M}$, respectively (block 302). The gain level control circuit 200 generates the second digital communications signals 212(1)-212(M) having the second digital amplitudes $D_{21}$-$D_{2N}$ based on the first digital communications signals 210(1)-210(N) (block 304). Each of the second digital amplitudes $D_{21}$-$D_{2N}$ is represented up to the full-scale digital amplitude in the predefined number of binary bits. The gain level control circuit 200 determines that a selected second digital communications signal among the second digital communications signals 212(1)-212(N) has the selected second digital amplitude among the second digital amplitudes $D_{21}$-$D_{2N}$ exceeding the full-scale digital amplitude that can be represented by the predefined number of binary bits (block 306). The gain level control circuit 200 further determines the selected first digital communications signal among the first digital communications signals 210(1)-210(M) having the selected first digital amplitude among the first digital amplitudes $D_{11}$-$D_{1M}$ causing the selected second digital amplitude to exceed the full-scale digital amplitude (block 308). Accordingly, the gain level control circuit 200 adjusts the selected first digital amplitude to reduce the selected second digital amplitude to lower than or equal to the full-scale digital amplitude (block 310).

With reference back to FIG. 2, in a non-limiting example, the gain level control circuit 200 can be configured to proactively prevent the selected second digital amplitude from exceeding the full-scale digital amplitude by detecting the selected second digital amplitude based on an adjusted full-scale digital amplitude. The adjusted full-scale digital amplitude can be determined by subtracting an amplitude margin from the full-scale digital amplitude. In this regard, the gain level control circuit 200 determines that the selected second digital communications signal has the selected second digital amplitude exceeding the adjusted full-scale digital amplitude. Accordingly, the gain level control circuit 200 determines the selected digital communications signal having the selected first digital amplitude causing the selected second digital amplitude to exceed the adjusted full-scale digital amplitude. Thus, the gain level control circuit 200 can control the digital signal distribution circuit 202 to adjust the selected first digital amplitude to reduce the selected second digital amplitude to lower than or equal to the adjusted full-scale digital amplitude. As such, it is possible for the gain level control circuit 200 to proactively prevent the digital amplitude clipping from happening.

Figure 4:
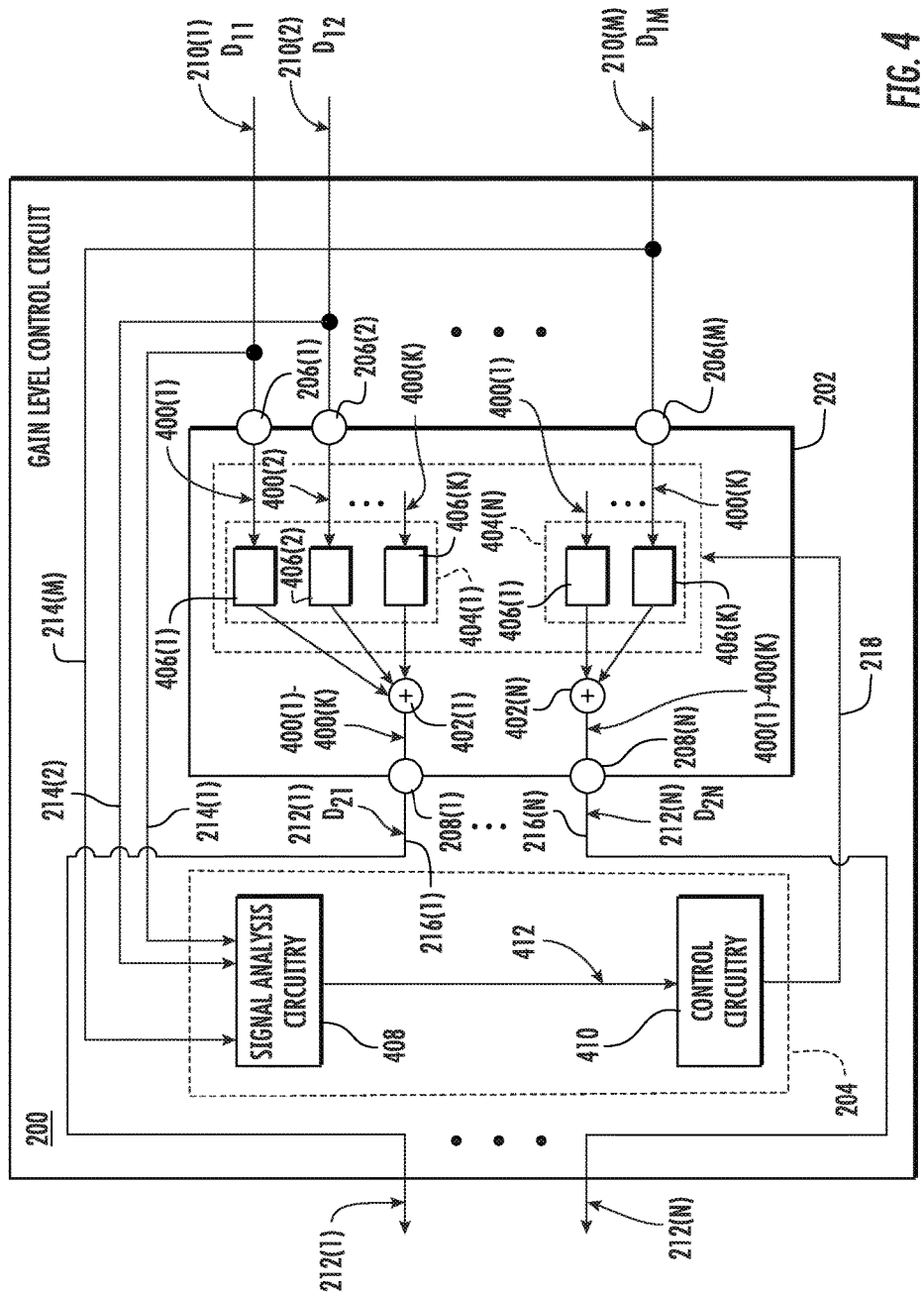
FIG. 4 is a schematic diagram providing an exemplary illustration of the gain level control circuit of FIG. 2 configured to generate a number of second digital communications signals by regrouping a number of first digital communications signals based on a number of frequency bands associated with the first digital communications signals.

In a non-limiting example, the first digital communications signals 210(1)-210(M) can be modulated in a plurality of frequency bands. Accordingly, the digital signal distribution circuit 202 can be configured to generate the second digital communications signals 212(1)-212(N) by grouping the first digital communications signals 210(1)-210(M) based on modulated frequency bands of the first digital communications signals 210(1)-210(M). In this regard, FIG. 4 is a schematic diagram providing an exemplary illustration of the gain level control circuit 200 of FIG. 2 configured to generate the second digital communications signals 212(1)-212(N) by regrouping the first digital communications signals 210(1)-210(M) based on the frequency bands associated with the first digital communications signals 210(1)-210(M). Common elements between FIGS. 2 and 4 are shown therein with common element numbers and will not be re-described herein.

With reference to FIG. 4, each of the second digital communications signals 212(1)-212(N) can include one or more first digital communications signals 400(1)-400(K) selected from the first digital communications signals 210(1)-210(M). In a non-limiting example, the first digital communications signals 400(1)-400(K) in each of the second digital communications signals 212(1)-212(N) can be so selected from the first digital communications signals 210(1)-210(M) to have an identical frequency band. Accordingly, it should be appreciated that each of the second digital communications signals 212(1)-212(N) can include a different number of the first digital communications signals 400(1)-400(K).

The digital signal distribution circuit 202 includes a plurality of digital signal combiners 402(1)-402(N) coupled to the digital signal outputs 208(1)-208(N), respectively. The digital signal combiners 402(1)-402(N) are configured to generate the second digital communications signals 212(1)-212(N) and provide the second digital communications signals 212(1)-212(N) to the digital signal outputs 208(1)-208(N), respectively. More specifically, each of the digital signal combiners 402(1)-402(N) is configured to combine the first digital communications signals 400(1)-400(K) to generate a respective second digital communications signal among the second digital communications signals 212(1)-212(N).

The digital signal distribution circuit 202 further includes a plurality of scaling circuits 404(1)-404(N) coupled to the digital signal combiners 402(1)-402(N), respectively. Each of the scaling circuits 404(1)-404(N) is configured to digitally scale and provide the first digital communications signals 400(1)-400(K) to a respective digital signal combiner among the digital signal combiners 402(1)-402(N). In a non-limiting example, each of the scaling circuits 404(1)-404(N) includes one or more digital scalers 406(1)-406(K) configured to digitally adjust one or more first digital amplitudes associated with the first digital communications signals 400(1)-400(K), respectively, in the respective second digital communications signal among the second digital communications signals 212(1)-212(N).

The digital signal processing circuit 204 can include signal analysis circuitry 408 and control circuitry 410. In a non-limiting example, the control circuitry 410 can be a microprocessor, a digital signal processor (DSP), or a field-programmable gate array (FPGA). The signal analysis circuitry 408 and the control circuitry 410 may be integrated into a single integrated circuit (IC) or provided in separate ICs.

The signal analysis circuitry 408 is coupled to the digital signal inputs 206(1)-206(M) via the input signal links 214(1)-214(M), respectively. The signal analysis circuitry 408 is coupled to the digital signal outputs 208(1)-208(N) via the output signal links 216(1)-216(N), respectively. The signal analysis circuitry 408 is configured to perform digital spectrum analysis on the first digital communications signals 210(1)-210(M) and/or the second digital communications signals 212(1)-212(N) to generate a spectrum analysis report. The spectrum analysis report may include such information as the first digital amplitudes $D_{11}$-$D_{1M}$ and/or the second digital amplitudes $D_{21}$-$D_{2N}$. The spectrum analysis report may also include such information with respect to the first digital communications signals 400(1)-400(K) included in each of the second digital communications signals 212(1)-212(N). The spectrum analysis report may further include such information with respect to respective sources (e.g., remote units) that the first digital communications signals 210(1)-210(M) are associated with. The signal analysis circuitry 408 may generate the spectrum analysis report by performing the FFT on the first digital communications signals 210(1)-210(M) and/or the second digital communications signals 212(1)-212(N). The signal analysis circuitry 408 may generate a feedback signal 412 including the spectrum analysis report and provide the feedback signal 412 to the control circuitry 410.

The control circuitry 410 receives the spectrum analysis report from the signal analysis circuitry 408 via the feedback signal 412. Thus, the control circuitry 410 can determine that the selected second digital amplitude exceeds the full-scale digital amplitude based on the spectrum analysis report. Accordingly, the control circuitry 410 determines the selected first digital communications signal among the first digital communications signals 400(1)-400(K) associated with the selected second digital communications signal that causes the selected second digital amplitude to exceed the full-scale digital amplitude. As such, the control circuitry 410 can control a selected digital scaler among the digital scalers 406(1)-406(K) to adjust the selected first digital amplitude to reduce the selected second digital amplitude to lower than or equal to the full-scale digital amplitude.

Figure 5:
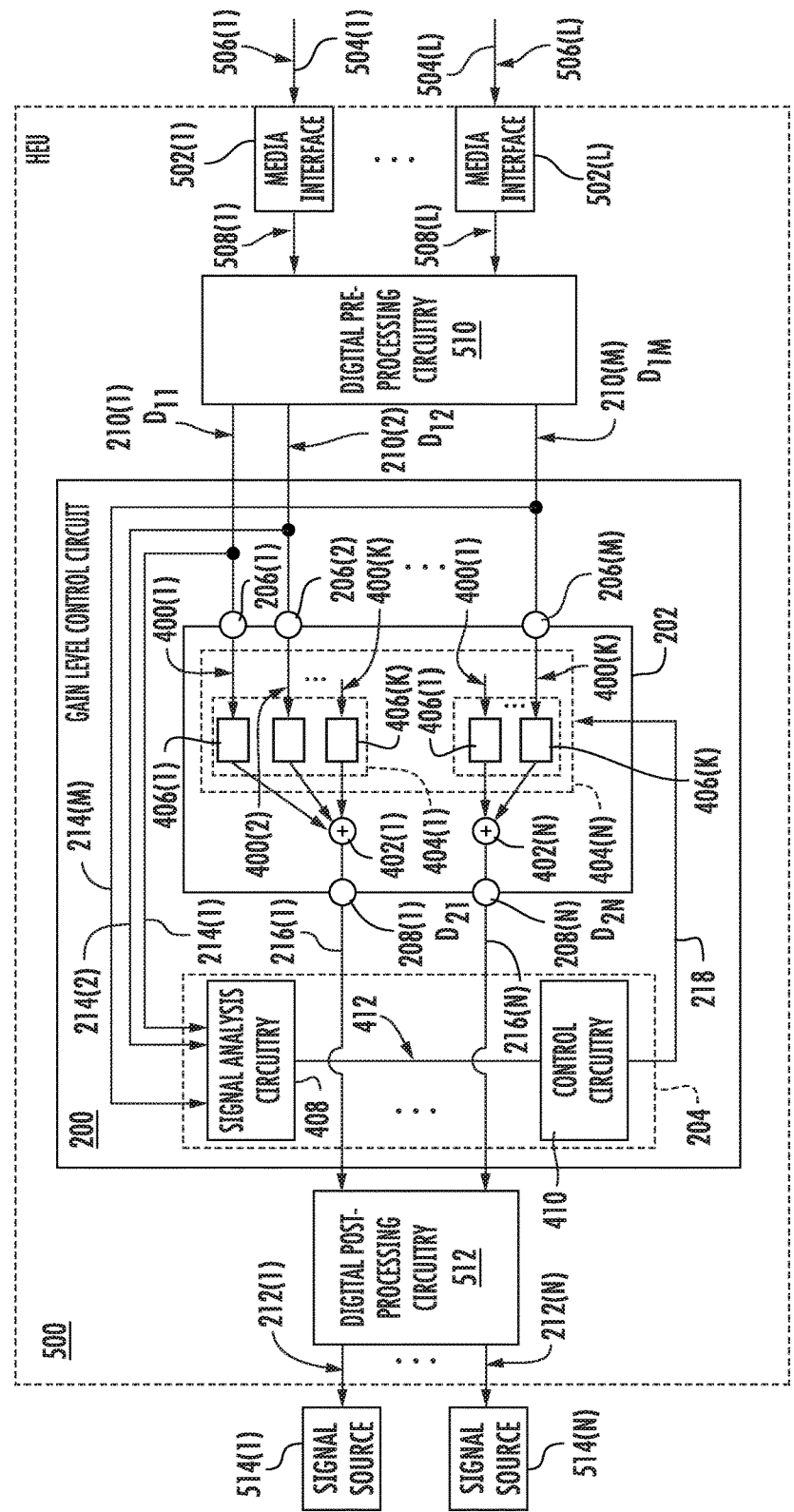
FIG. 5 is a schematic diagram of an exemplary HEU configured to employ the gain level control circuit of FIGS. 2 and 4 to support dynamic gain control to overcome digital amplitude clipping in the HEU.

The gain level control circuit 200 as illustrated in FIGS. 2 and 4 can be provided in an HEU in a WDS to support dynamic gain control to overcome digital amplitude clipping. In this regard, FIG. 5 is a schematic diagram of an exemplary HEU 500 configured to employ the gain level control circuit 200 of FIGS. 2 and 4 to support dynamic gain control to overcome digital amplitude clipping in the HEU 500. Common elements between FIGS. 2, 4, and 5 are shown therein with common element numbers and will not be re-described herein. In a non-limiting example, the HEU 500 can be implemented as a DRU.

The HEU 500 includes a plurality of media interfaces 502(1)-502(L) coupled to a plurality of communications mediums 504(1)-504(L). The media interfaces 502(1)-502(L) are configured to receive a plurality of optical uplink communications signals 506(1)-506(L), which may be communicated from remote units coupled to the communications mediums 504(1)-504(L). The media interfaces 502(1)-502(L) may include optical-to-electrical (O/E) converters and analog-to-digital converters (ADCs) configured to convert the optical uplink communications signals 506(1)-506(L) into a plurality of digital uplink communications signals 508(1)-508(L).

The HEU 500 includes digital pre-processing circuitry 510 coupled between the media interfaces 502(1)-502(L) and the digital signal inputs 206(1)-206(M). The digital pre-processing circuitry 510 receives the digital uplink communications signals 508(1)-508(L) from the media interfaces 502(1)-502(L). The digital pre-processing circuitry 510 may de-packetize and/or demodulate the digital uplink communications signals 508(1)-508(L) (e.g., based on frequency bands) to generate the first digital communications signals 210(1)-210(M). The digital pre-processing circuitry 510 then provides the first digital communications signals 210(1)-210(M) to the digital signal inputs 206(1)-206(M), respectively.

The HEU 500 also includes digital post-processing circuitry 512 coupled to the digital signal outputs 208(1)-208(N). The digital post-processing circuitry 512 receives the second digital communications signals 212(1)-212(N) from the digital signal outputs 208(1)-208(N). The digital post-processing circuitry 512 may be configured to packetize the second digital communications signals 212(1)-212(N) based on such digital communication protocols as common public radio interface (CPRI). The digital post-processing circuitry 512 may be coupled to a plurality of signal sources 514(1)-514(N), which may be digital baseband units (BBUs) for example and configured to provide the second digital communications signals 212(1)-212(N) to the signal sources 514(1)-514(N).

Figure 6:
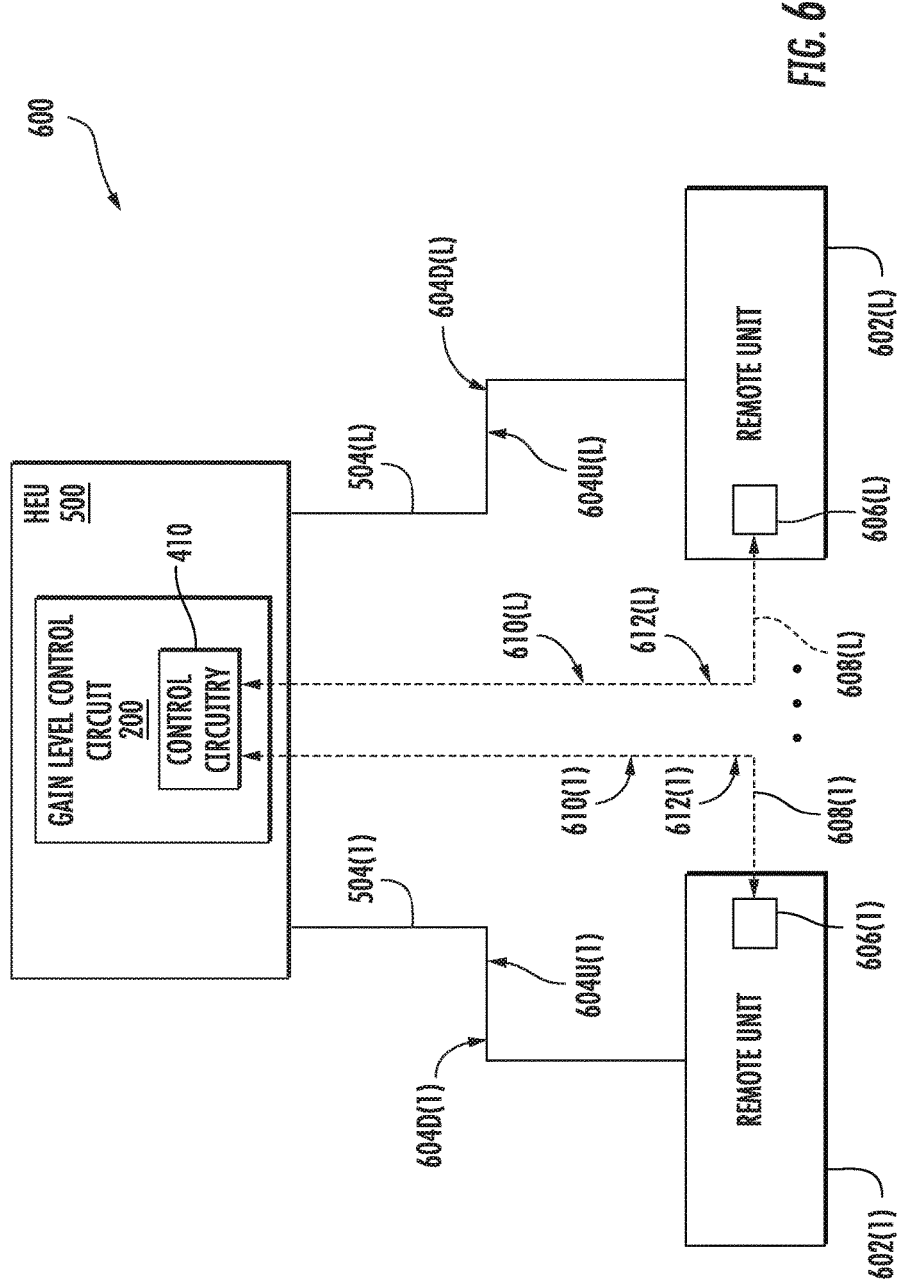
FIG. 6 is a schematic diagram of a WDS configured to include the HEU of FIG. 5 to support dynamic gain control to overcome digital amplitude clipping in the HEU.

The HEU 500 can be provided in a WDS to support dynamic gain control to overcome digital amplitude clipping in the HEU 500. In this regard, FIG. 6 is a schematic diagram of a WDS 600 configured to include the HEU 500 of FIG. 5 to support dynamic gain control to overcome digital amplitude clipping in the HEU 500. Common elements between FIGS. 5 and 6 are shown therein with common element numbers and will not be re-described herein.

The WDS 600 includes a plurality of remote units 602(1)-602(L) coupled to the HEU 500 via the communications mediums 504(1)-504(L), respectively. The HEU 500 is configured to distribute a plurality of downlink communications signals 604D(1)-604D(L) to the remote units 602(1)-602(L) via the communications mediums 504(1)-504(L). The HEU 500 is also configured to receive a plurality of uplink communications signals 604U(1)-604U(L) from the remote units 602(1)-602(L) via the communications mediums 504(1)-504(L). The remote units 602(1)-602(L) include a plurality of remote unit controllers 606(1)-606(L). In a non-limiting example, the remote unit controllers 606(1)-606(L) are communicatively coupled to the control circuitry 410 in the HEU 500 via a plurality of control links 608(1)-608(L), which can be physically located inside the communications mediums 504(1)-504(L) for example.

The remote unit controllers 606(1)-606(L) can be configured to generate a plurality of remote unit feedback signals 610(1)-610(L) and provide the remote unit feedback signals 610(1)-610(L) to the HEU 500 over the control links 608(1)-608(L), respectively. Each of the remote unit feedback signals 610(1)-610(L) may include a respective remote unit spectrum analysis report, which the control circuitry 410 can use in combination with the spectrum analysis report received in the feedback signal 412 to help determine the selected second digital communications signal exceeding the full-scale digital amplitude represented by the predefined number of binary bits.

For example, the control circuitry 410 may determine that a selected remote unit among the remote units 602(1)-602(L) has generated a selected uplink communications signal among the uplink communications signals 604U(1)-604U(L) causing the selected second digital amplitude to exceed the full-scale digital amplitude. In this regard, in addition to controlling the digital signal distribution circuit 202 in the gain level control circuit 200, the control circuitry 410 may further control a selected remote unit controller among the remote unit controllers 606(1)-606(L) to help overcome digital amplitude clipping in the HEU 500. The control circuitry 410 may control the remote unit controllers 606(1)-606(L) via a plurality of remote unit control signals 612(1)-612(L), respectively. To help understand how the control circuitry 410 can utilize the remote unit controllers 606(1)-606(L) to help overcome digital amplitude clipping in the HEU 500, a brief discussion of a selected remote unit among the remote units 602(1)-602(L) is provided next with reference to FIG. 7.

Figure 7:
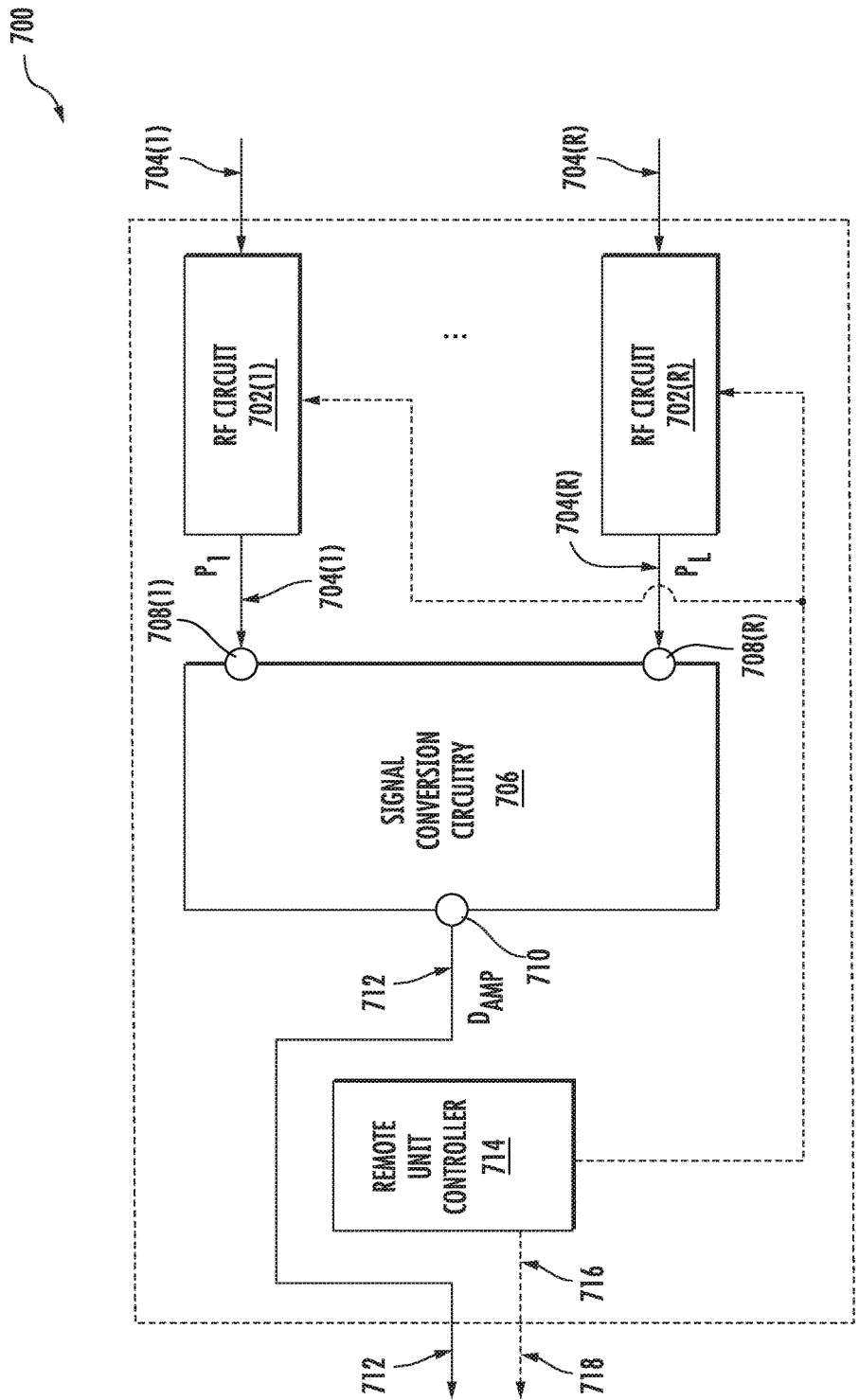
FIG. 7 is a schematic diagram of an exemplary remote unit that can be provided in the WDS of FIG. 6.

In this regard, FIG. 7 is a schematic diagram of an exemplary remote unit 700 that can be provided in the WDS 600 of FIG. 6 as any of the remote units 602(1)-602(L). The remote unit 700 includes a plurality of RF circuits 702(1)-702(R) configured to receive and amplify a plurality of RF communications signals 704(1)-704(R) to a plurality of power levels $P_1$-$P_L$, respectively. The remote unit 700 includes signal conversion circuitry 706. The signal conversion circuitry 706 includes a plurality of RF signal inputs 708(1)-708(R) and a digital signal output 710. The signal conversion circuitry 706 is configured to receive the RF communications signals 704(1)-704(R) from the RF signal inputs 708(1)-708(R), respectively, and generate a combined digital communications signal 712 having a digital amplitude $D_{AMP}$ based on the RF communications signals 704(1)-704(R).

The remote unit 700 includes a remote unit controller 714, which can be a microcontroller, a microprocessor, or a FPGA for example. The remote unit controller 714 is functionally equivalent to any of the remote unit controllers 606(1)-606(L) as shown in the WDS 600 of FIG. 6. The remote unit controller 714 is configured to perform spectrum analysis on the combined digital communications signal 712 to generate a remote unit spectrum analysis report. The remote unit controller 714 may generate a remote unit feedback signal 716 including the remote unit spectrum analysis report and provide the remote unit feedback signal 716 to the HEU 500 over a selected communications medium among the communications mediums 504(1)-504 (L). In this regard, the remote unit feedback signal 716 is equivalent to any of the remote unit feedback signals 610 (1)-610(L) in FIG. 6.

As previously described in FIG. 6, the control circuitry 410 may determine that a selected remote unit among the remote units 602(1)-602(L) has generated a selected uplink communications signal among the uplink communications signals 604U(1)-604U(L) causing the selected second digital amplitude to exceed the full-scale digital amplitude. In this regard, the control circuitry 410 in the HEU 500 may determine that the digital amplitude $D_{AMP}$ of the combined digital communications signal 712 has caused the selected second digital amplitude to exceed the full-scale digital amplitude. As such, the control circuitry 410 may provide a selected remote unit control signal 718 among the remote unit control signals 612(1)-612(L) to the remote unit controller 714. In response to receiving the selected remote unit control signal 718, the remote unit controller 714 may control the RF circuits 702(1)-702(R) to adjust the power levels $P_1$-$P_L$ of the RF communications signals 704(1)-704 (R), thus reducing the digital amplitude $D_{AMP}$ of the combined digital communications signal 712 to help reduce the selected second digital amplitude to lower than or equal to the full-scale digital amplitude in the HEU 500.

Note that any of the communications signals, bands, and services described herein may be RF communications signals, bands, and services. Supported RF communications services in the WWDSs disclosed herein can include any communications bands desired. Examples of communications services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDS can be configured to support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

Figure 8:
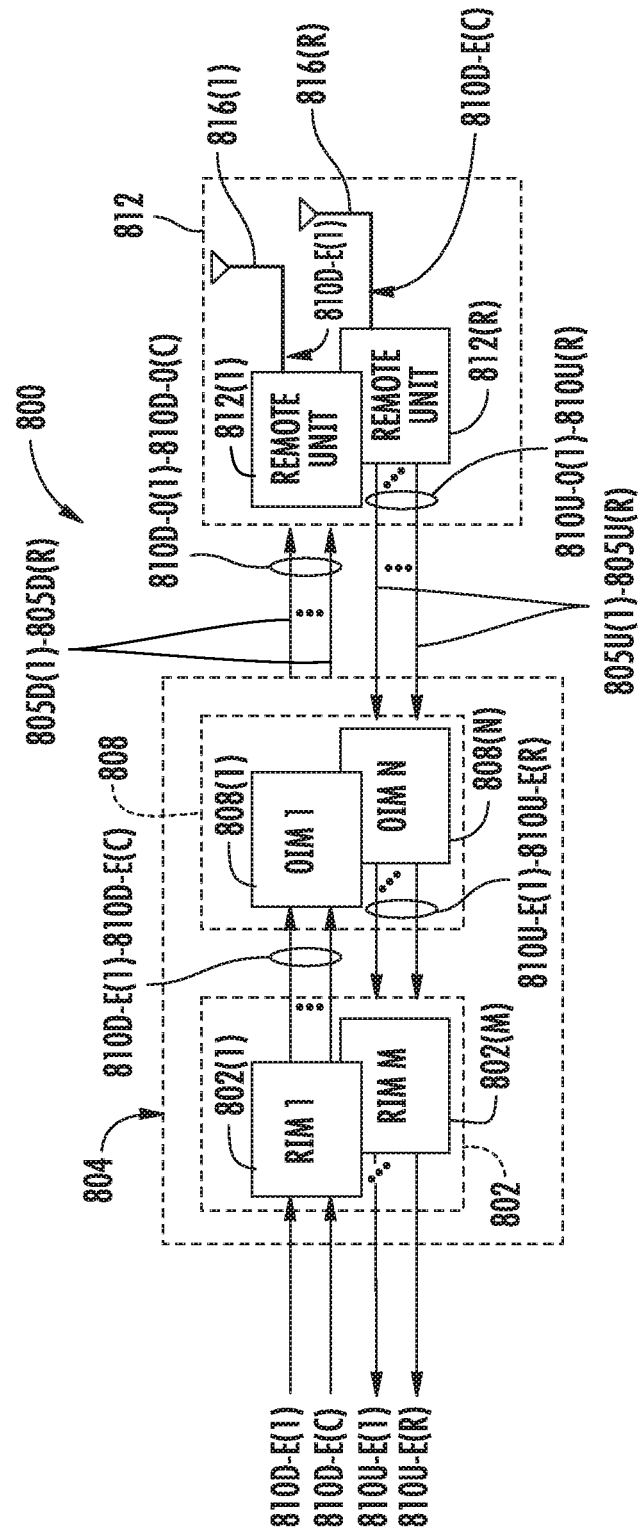
FIG. 8 is a schematic diagram of such an exemplary optical-fiber based WDS configured to function as the WDS of FIG. 6 to support dynamic gain control to overcome digital amplitude clipping.

The WDS 600 of FIG. 6 can be provided as an optical-based WDS. In this regard, FIG. 8 is a schematic diagram of such an exemplary optical-fiber based WDS 800 configured to function as the WDS 600 of FIG. 6 to support dynamic gain control to overcome digital amplitude clipping. The optical-fiber based WDS 800 is comprised of three (3) main components. One or more radio interfaces provided in the form of radio interface modules (RIMs) 802(1)-802(M) are provided in a central unit 804, which can be functionally equivalent to the HEU 500 of FIGS. 5 and 6, to receive and process RF downlink communications signals 810D-E(1)-810D-E(C) prior to optical conversion into optical downlink communications signals. The RIMs 802(1)-802(M) provide both downlink and uplink interfaces for signal processing. The notations "1-M" and "1-C" indicate that any number of the referenced component, 1-M and 1-C, respectively, may be provided.

With continuing reference to FIG. 8, the central unit 804 is configured to accept the RIMs 802(1)-802(M) as modular components that can easily be installed and removed or replaced in the central unit 804. In one embodiment, the central unit 804 is configured to support up to twelve (12) RIMs 802(1)-802(12). Each RIM 802(1)-802(M) can be designed to support a particular type of radio source or range of radio sources (i.e., frequencies) to provide flexibility in configuring the central unit 804 and the optical-fiber based WDS 800 to support the desired radio sources. For example, one RIM 802 may be configured to support the Personal Communication Services (PCS) radio band. Another RIM 802 may be configured to support the 700 MHz radio band. In this example, by inclusion of these RIMs 802, the central unit 804 could be configured to support and distribute communications signals, including those for the communications services and communications bands described above as examples.

The RIMs 802(1)-802(M) may be provided in the central unit 804 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the RF downlink communications signals 810D-E(1)-810D-E(C) may be provided as downlink RF spectrum chunks to a plurality of optical interfaces provided in the form of optical interface modules (OIMs) 808(1)-808(N) in this embodiment to convert the unlicensed and/or licensed RF downlink communications signals 810D-E(1)-810D-E(C) into optical downlink communications signals 810D-0(1)-810D-0(C). The OIMs 808(1)-808(N) may be configured to provide one or more optical interface components (OICs) that contain optical-to-electrical (O-E) and electrical-to-optical (E-O) converters, as will be described in more detail below. The OIMs 808(1)-808(N) support the radio bands that can be provided by the RIMs 802(1)-802(M), including the examples previously described above.

The OIMs 808(1)-808(N) each include E-O converters to convert the RF downlink communications signals 810D-E(1)-810D-E(C) into the optical downlink communications signals 810D-O(1)-810D-O(C). The optical downlink communications signals 810D-O(1)-810D-O(C) are communicated over a plurality of downlink optical fiber communications mediums 805D(1)-805D(R) to a plurality of remote units 812(1)-812(R). In a non-limiting example, at least one of the remote units 812(1)-812(R) is functionally equivalent to the remote unit 700 of FIG. 7 or the remote units 602(1)-602(L) of FIG. 6. O-E converters provided in the remote units 812(1)-812(R) convert the optical downlink communications signals 810D-O(1)-810D-O(C) back into the RF downlink communications signals 810D-E(1)-810D-E(C), which are provided to antennas 816(1)-816(R) in the remote units 812(1)-812(R) to user equipment (not shown) in the reception range of the antennas 816(1)-816(R).

E-O converters are also provided in the remote units 812(1)-812(R) to convert RF uplink communications signals 810U-E(1)-810U-E(R) received from user equipment (not shown) through the antennas 816(1)-816(R) into optical uplink communications signals 810U-O(1)-810U-O(R). The remote units 812(1)-812(R) communicate the optical uplink communications signals 810U-O(1)-810U-O(R) over a plurality of uplink optical fiber communications mediums 805U(1)-805U(R) to the OIMs 808(1)-808(N) in the central unit 804. The OIMs 808(1)-808(N) include O-E converters that convert the received optical uplink communications signals 810U-O(1)-810U-O(R) into RF uplink communications signals 810U-E(1)-810U-E(R), which are processed by the RIMs 802(1)-802(M) and provided as RF uplink communications signals 810U-E(1)-810U-E(R).

Note that the downlink optical fiber communications medium 805D(1)-805D(R) and uplink optical fiber communications medium 805U(1)-805U(R) connected to each remote unit 812(1)-812(R) may be a common optical fiber communications medium, wherein for example, wave division multiplexing (WDM) may be employed to provide the optical downlink communications signals 810D-O(1)-810D-O(C) and the optical uplink communications signals 810U-O(1)-810U-O(R) on the same optical fiber communications medium.

Figure 9:
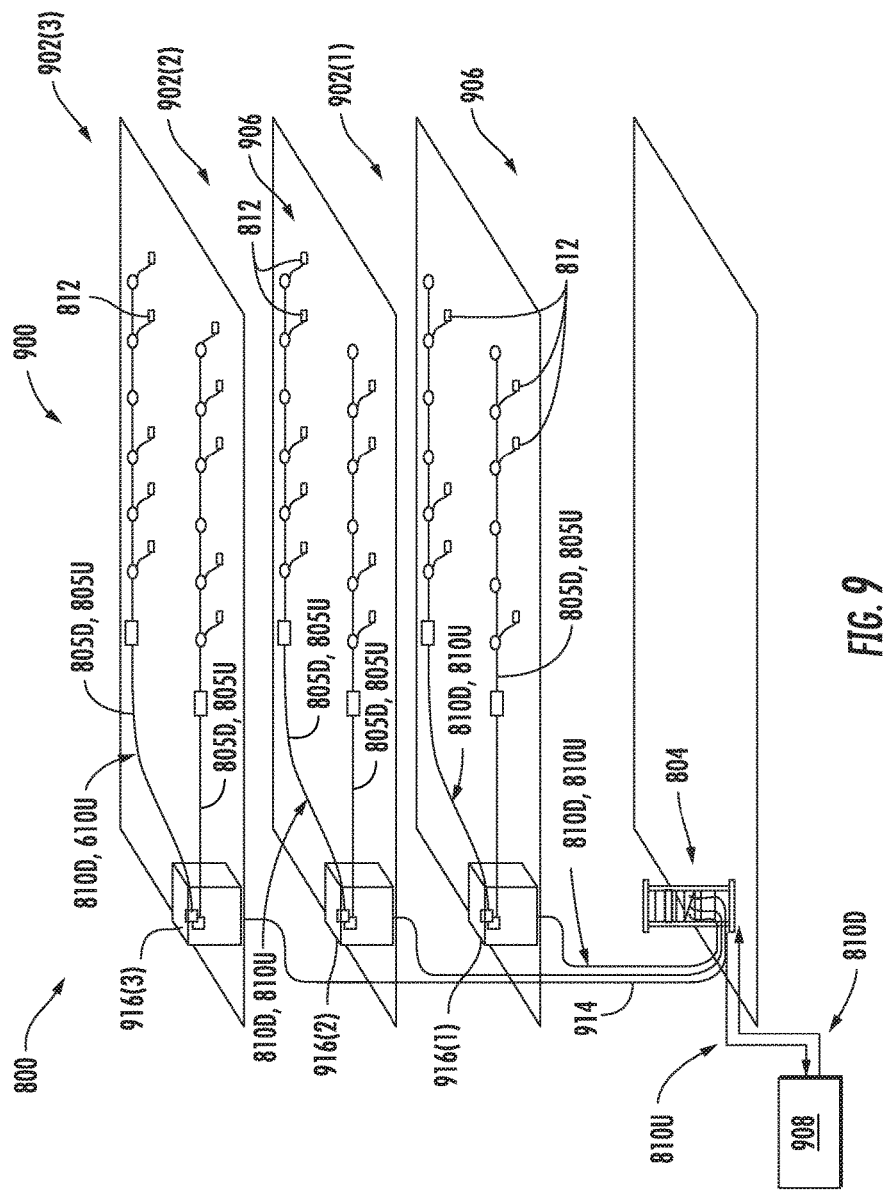
FIG. 9 is a partially schematic cut-away diagram of a building infrastructure employing the WDS of FIG. 8.

The optical-fiber based WDS 800 of FIG. 8 is configured to support dynamic gain control to overcome digital amplitude clipping that can be provided in an indoor environment, such as illustrated in FIG. 9. In this regard, FIG. 9 is a partially schematic cut-away diagram of a building infrastructure 900 employing the WDS 800 of FIG. 8. The building infrastructure 900 in this embodiment includes a first (ground) floor 902(1), a second floor 902(2), and a third floor 902(3). The floors 902(1)-902(3) are serviced by the central unit 804 to provide antenna coverage areas 906 in the building infrastructure 900. The central unit 804 is configured to receive downlink communications signals 810D from a signal source 908. The central unit 804 is communicatively coupled to the remote units 812 to receive uplink communications signals 810U from the remote units 812, similar to as previously discussed above for other WDSs. The downlink and uplink communications signals 810D, 810U communicated between the central unit 804 and the remote units 812 are carried over a riser cable 914 in this example. The riser cable 914 may be routed through interconnect units (ICUs) 916(1)-916(3) dedicated to each floor 902(1)-902(3) that route the downlink and uplink communications signals 810D, 810U to the remote units 812 and also provide power to the remote units 812 via the downlink and uplink communications medium 805D, 805U.

Figure 10:
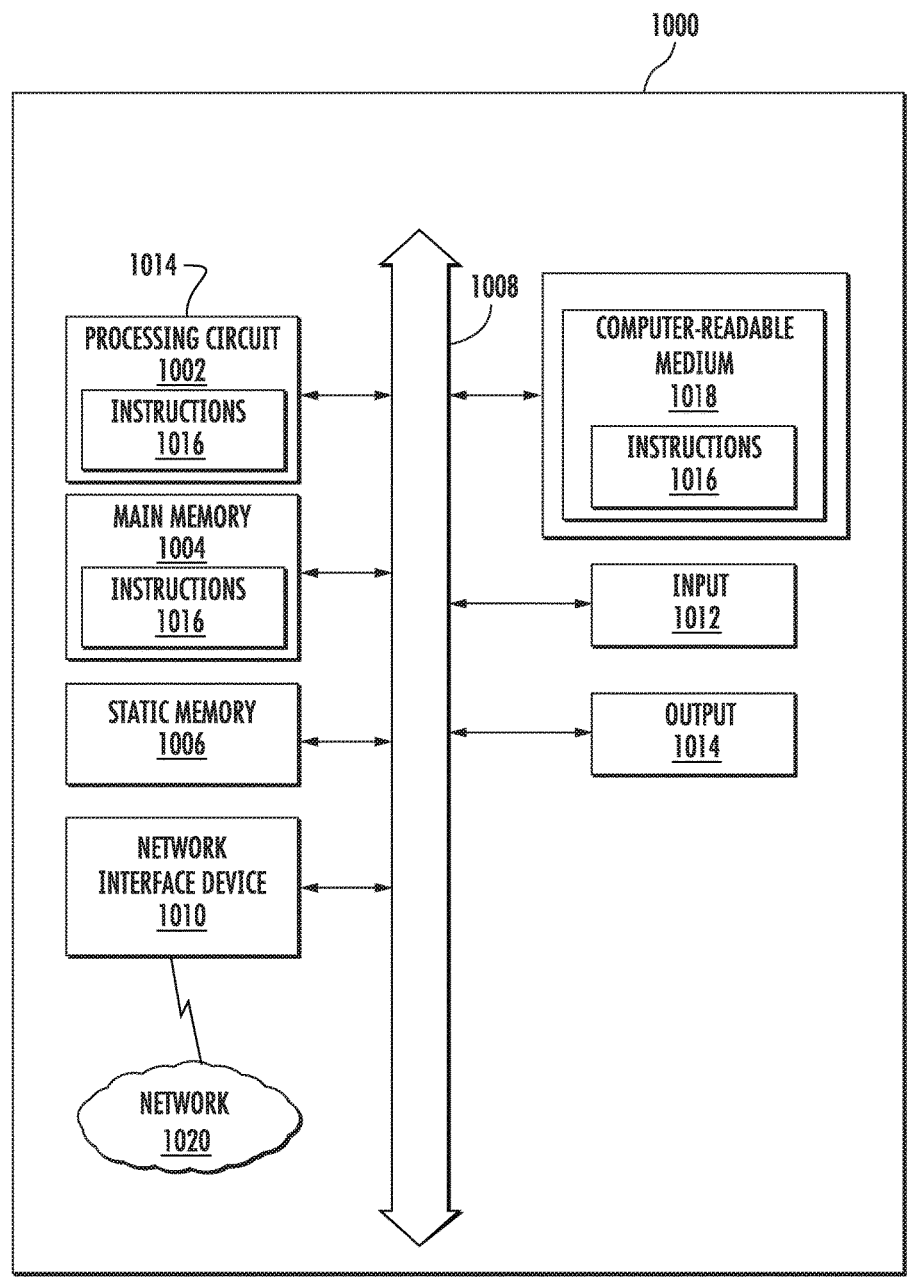
FIG. 10 is a schematic diagram representation of additional detail illustrating a computer system that could be employed in the gain level control circuit of FIGS. 2, 4, and 5 and the HEU of FIG. 6 to support dynamic gain control to overcome digital amplitude clipping.

FIG. 10 is a schematic diagram representation of additional detail illustrating a computer system 1000 that could be employed in the gain level control circuit 200 of FIGS. 2, 4, 5, and 6 to support dynamic gain control to overcome digital amplitude clipping. In this regard, the computer system 1000 is adapted to execute instructions from an exemplary computer-readable medium to perform these and/or any of the functions or processing described herein.

In this regard, the computer system 1000 in FIG. 10 may include a set of instructions that may be executed to program and configure programmable digital signal processing circuits in a WDS for supporting scaling of supported communications services. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing circuit or processor 1002, a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or static memory 1006 directly or via some other connectivity means. The processor 1002 may be a controller, and the main memory 1004 or static memory 1006 may be any type of memory.

The processor 1002 represents one or more general-purpose processing devices, such as a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A gain level control circuit in a wireless communications system (WCS), comprising:
   a digital signal distribution circuit comprising a plurality of digital signal inputs and a plurality of digital signal outputs, the digital signal distribution circuit configured to:
      receive a plurality of first digital communications signals having a plurality of first digital amplitudes from the plurality of digital signal inputs, respectively; and
      generate a plurality of second digital communications signals having a plurality of second digital amplitudes at the plurality of digital signal outputs based on the plurality of first digital communications signals, wherein each of the plurality of second digital amplitudes is represented up to a full-scale digital amplitude in a predefined number of binary bits; and
   a digital signal processing circuit coupled to the plurality of digital signal inputs, the digital signal processing circuit configured to:
      determine that a selected second digital communications signal among the plurality of second digital communications signals has a selected second digital amplitude among the plurality of second digital amplitudes approaching the full-scale digital amplitude that can be represented by the predefined number of binary bits;
      determine a selected first digital communications signal among the plurality of first digital communications signals having a selected first digital amplitude causing the selected second digital amplitude to approach the full-scale digital amplitude; and
      control the digital signal distribution circuit to adjust the selected first digital amplitude to reduce the selected second digital amplitude.

2. The gain level control circuit of claim 1, wherein the digital signal processing circuit is further configured to:
   determine that the selected second digital communications signal has the selected second digital amplitude exceeding an adjusted full-scale digital amplitude determined by subtracting an amplitude margin from the full-scale digital amplitude;
   determine the selected first digital communications signal having the selected first digital amplitude causing the selected second digital amplitude to exceed the adjusted full-scale digital amplitude; and
   control the digital signal distribution circuit to adjust the selected first digital amplitude to reduce the selected second digital amplitude to lower than or equal to the adjusted full-scale digital amplitude.

3. The gain level control circuit of claim 1, wherein:
   the plurality of second digital communications signals each comprise one or more first digital communications signals selected from the plurality of first digital communications signals; and
   the digital signal processing circuit is further configured to:
      determine the selected first digital communications signal among the one or more first digital communications signals comprised in the selected second digital communications signal having the selected first digital amplitude causing the selected second digital amplitude to exceed the full-scale digital amplitude; and
      control the digital signal distribution circuit to adjust the selected first digital amplitude to reduce the selected second digital amplitude to lower than or equal to the full-scale digital amplitude.

4. The gain level control circuit of claim 3, wherein:
   the plurality of first digital communications signals is modulated in a plurality of frequency bands; and
   each of the plurality of second digital communications signals comprises the one or more first digital communications signals having an identical frequency band among the plurality of frequency bands.

5. The gain level control circuit of claim 3, wherein the digital signal distribution circuit comprises a plurality of digital signal combiners coupled to the plurality of digital signal outputs, the plurality of digital signal combiners configured to:
   generate the plurality of second digital communications signals each comprising the one or more first digital communications signals selected from the plurality of first digital communications signals; and
   provide the plurality of second digital communications signals to the plurality of digital signal outputs, respectively.

6. The gain level control circuit of claim 5, wherein each of the plurality of digital signal combiners is further configured to combine the one or more first digital communications signals to generate a respective second digital communications signal among the plurality of second digital communications signals.

7. The gain level control circuit of claim 6, wherein the digital signal distribution circuit further comprises a plurality of scaling circuits coupled to the plurality of digital signal combiners, respectively, the plurality of scaling circuits each configured to digitally scale and provide the one or more first digital communications signals to a respective digital signal combiner among the plurality of digital signal combiners.

8. The gain level control circuit of claim 7, wherein each of the plurality of scaling circuits comprises one or more digital scalers configured to adjust one or more first digital amplitudes of the one or more first digital communications signals comprised in the respective second digital communications signal among the plurality of second digital communications signals.

9. The gain level control circuit of claim 8, wherein the digital signal processing circuit comprises:
   signal analysis circuitry coupled to the plurality of digital signal inputs, the signal analysis circuitry configured to:

perform a digital spectrum analysis on the plurality of first digital communications signals and the plurality of second digital communications signals to generate a spectrum analysis report; and
generate a feedback signal comprising the spectrum analysis report; and
control circuitry coupled to the signal analysis circuitry, the control circuitry configured to:
receive the feedback signal comprising the spectrum analysis report;
determine that the selected second digital communications signal has the selected second digital amplitude approaching the full-scale digital amplitude represented by the predefined number of binary bits based on the spectrum analysis report;
determine the selected first digital communications signal among the one or more first digital communications signals comprised in the selected second digital communications signal having the selected first digital amplitude causing the selected second digital amplitude to approach the full-scale digital amplitude; and
control a selected digital scaler to adjust the selected first digital amplitude to reduce the selected second digital amplitude.

10. The gain level control circuit of claim 9, wherein the signal analysis circuitry is further configured to perform the digital spectrum analysis on the plurality of first digital communications signals based on Fast Fourier Transform (FFT).

11. The gain level control circuit of claim 1 provided in a head-end unit (HEU) and/or a digital routing unit (DRU) in the WCS.

12. A method for supporting dynamic gain control in a wireless communications system (WCS), comprising:
receiving a plurality of first digital communications signals having a plurality of first digital amplitudes, respectively;
generating a plurality of second digital communications signals having a plurality of second digital amplitudes based on the plurality of first digital communications signals, wherein each of the plurality of second digital amplitudes is represented up to a full-scale digital amplitude in a predefined number of binary bits;
determining that a selected second digital communications signal among the plurality of second digital communications signals has a selected second digital amplitude among the plurality of second digital amplitudes approaching the full-scale digital amplitude that can be represented by the predefined number of binary bits;
determining a selected first digital communications signal among the plurality of first digital communications signals having a selected first digital amplitude causing the selected second digital amplitude to approach the full-scale digital amplitude; and
adjusting the selected first digital amplitude to reduce the selected second digital amplitude.

13. The method of claim 12, further comprising:
determining that the selected second digital communications signal has the selected second digital amplitude exceeding an adjusted full-scale digital amplitude determined by subtracting an amplitude margin from the full-scale digital amplitude;
determining the selected first digital communications signal having the selected first digital amplitude causing the selected second digital amplitude to exceed the adjusted full-scale digital amplitude; and
adjusting the selected first digital amplitude to reduce the selected second digital amplitude to lower than or equal to the adjusted full-scale digital amplitude.

14. The method of claim 12, further comprising:
generating the plurality of second digital communications signals each comprising one or more first digital communications signals selected from the plurality of first digital communications signals;
determining the selected first digital communications signal among the one or more first digital communications signals comprised in the selected second digital communications signal having the selected first digital amplitude causing the selected second digital amplitude to exceed the full-scale digital amplitude; and
adjusting the selected first digital amplitude to reduce the selected second digital amplitude to lower than or equal to the full-scale digital amplitude.

15. The method of claim 14, further comprising:
receiving the plurality of first digital communications signals in a plurality of frequency bands; and
generating each of the plurality of second digital communications signals comprising the one or more first digital communications signals having an identical frequency band among the plurality of frequency bands.

16. The method of claim 14, further comprising generating the plurality of second digital communications signals each comprising the one or more first digital communications signals selected from the plurality of first digital communications signals.

17. The method of claim 16, further comprising combining the one or more first digital communications signals to generate a respective second digital communications signal among the plurality of second digital communications signals.

18. The method of claim 17, further comprising:
performing a digital spectrum analysis on the plurality of first digital communications signals and the plurality of second digital communications signals to generate a spectrum analysis report;
generating a feedback signal comprising the spectrum analysis report;
determining that the selected second digital communications signal has the selected second digital amplitude approaching the full-scale digital amplitude represented by the predefined number of binary bits based on the spectrum analysis report;
determining the selected first digital communications signal among the one or more first digital communications signals comprised in the selected second digital communications signal having the selected first digital amplitude causing the selected second digital amplitude to approach the full-scale digital amplitude; and
reducing the selected second digital amplitude.

19. The method of claim 18, further comprising performing the digital spectrum analysis on the plurality of first digital communications signals based on Fast Fourier Transform (FFT).

20. A head-end unit (HEU) in a wireless communications system (WCS) comprising a gain level control circuit, the gain level control circuit comprising:
a digital signal distribution circuit comprising a plurality of digital signal inputs and a plurality of digital signal outputs, the digital signal distribution circuit configured to:

receive a plurality of first digital communications signals having a plurality of first digital amplitudes from the plurality of digital signal inputs, respectively; and generate a plurality of second digital communications signals having a plurality of second digital amplitudes at the plurality of digital signal outputs based on the plurality of first digital communications signals, wherein each of the plurality of second digital amplitudes is represented up to a full-scale digital amplitude in a predefined number of binary bits; and a digital signal processing circuit coupled to the plurality of digital signal inputs, the digital signal processing circuit configured to:

determine that a selected second digital communications signal among the plurality of second digital communications signals has a selected second digital amplitude among the plurality of second digital amplitudes approaching the full-scale digital amplitude that can be represented by the predefined number of binary bits;

determine a selected first digital communications signal among the plurality of first digital communications signals having a selected first digital amplitude causing the selected second digital amplitude to approach the full-scale digital amplitude; and control the digital signal distribution circuit to adjust the selected first digital amplitude to reduce the selected second digital amplitude.

21. The HEU of claim 20, further comprising:

a plurality of media interfaces coupled to a plurality of communications mediums, the plurality of media interfaces configured to:

receive a plurality of optical uplink communications signals; and convert the plurality of optical uplink communications signals into a plurality of digital uplink communications signals, respectively;

digital pre-processing circuitry coupled between the plurality of media interfaces and the plurality of digital signal inputs, the digital pre-processing circuitry configured to:

receive the plurality of digital uplink communications signals from the plurality of media interfaces;

convert the plurality of digital uplink communications signals into the plurality of first digital communications signals; and provide the plurality of first digital communications signals to the plurality of digital signal inputs, respectively; and digital post-processing circuitry coupled to the plurality of digital signal outputs, the digital post-processing circuitry configured to:

receive the plurality of second digital communications signals from the plurality of digital signal outputs; and provide the plurality of second digital communications signals to a plurality of signal source interfaces.

22. A digital routing unit (DRU) in a wireless communications system (WCS) comprising a gain level control circuit, the gain level control circuit comprising:

a digital signal distribution circuit comprising a plurality of digital signal inputs and a plurality of digital signal outputs, the digital signal distribution circuit configured to:

receive a plurality of first digital communications signals having a plurality of first digital amplitudes from the plurality of digital signal inputs, respectively; and generate a plurality of second digital communications signals having a plurality of second digital amplitudes at the plurality of digital signal outputs based on the plurality of first digital communications signals, wherein each of the plurality of second digital amplitudes is represented up to a full-scale digital amplitude in a predefined number of binary bits; and a digital signal processing circuit coupled to the plurality of digital signal inputs, the digital signal processing circuit configured to:

determine that a selected second digital communications signal among the plurality of second digital communications signals has a selected second digital amplitude among the plurality of second digital amplitudes approaching the full-scale digital amplitude that can be represented by the predefined number of binary bits;

determine a selected first digital communications signal among the plurality of first digital communications signals having a selected first digital amplitude causing the selected second digital amplitude to approach the full-scale digital amplitude; and control the digital signal distribution circuit to adjust the selected first digital amplitude to reduce the selected second digital amplitude.

23. A wireless distribution system (WDS), comprising:

a plurality of remote units; and a head-end unit (HEU) coupled to the plurality of remote units via a plurality of communications mediums, respectively, the HEU configured to:

distribute a plurality of downlink communications signals to the plurality of remote units via the plurality of communications mediums, respectively; and receive a plurality of uplink communications signals from the plurality of remote units via the plurality of communications mediums, respectively;

wherein the HEU comprises a gain level control circuit, the gain level control circuit comprises:

a digital signal distribution circuit comprising a plurality of digital signal inputs and a plurality of digital signal outputs, the digital signal distribution circuit configured to:

receive a plurality of first digital communications signals having a plurality of first digital amplitudes from the plurality of digital signal inputs, respectively; and generate a plurality of second digital communications signals having a plurality of second digital amplitudes at the plurality of digital signal outputs based on the plurality of first digital communications signals, wherein each of the plurality of second digital amplitudes is represented up to a full-scale digital amplitude in a predefined number of binary bits; and a digital signal processing circuit coupled to the plurality of digital signal inputs, the digital signal processing circuit configured to:

determine that a selected second digital communications signal among the plurality of second digital communications signals has a selected second digital amplitude among the plurality of second digital amplitudes approaching the full-scale digital amplitude that can be represented by the predefined number of binary bits;
determine a selected first digital communications signal among the plurality of first digital communications signals having a selected first digital amplitude causing the selected second digital amplitude to approach the full-scale digital amplitude; and
control the digital signal distribution circuit to adjust the selected first digital amplitude to reduce the selected second digital amplitude.

24. The WDS of claim 23, wherein the digital signal processing circuit comprises:
signal analysis circuitry coupled to the plurality of digital signal inputs, the signal analysis circuitry configured to:
perform digital spectrum analysis on the plurality of first digital communications signals and the plurality of second digital communications signals to generate a spectrum analysis report; and
generate a feedback signal comprising the spectrum analysis report; and
control circuitry coupled to the signal analysis circuitry, the control circuitry configured to:
receive the feedback signal comprising the spectrum analysis report;
determine that the selected second digital communications signal has the selected second digital amplitude approaching the full-scale digital amplitude represented by the predefined number of binary bits based on the spectrum analysis report;
determine the selected first digital communications signal causing the selected second digital amplitude to approach the full-scale digital amplitude; and
control a selected digital scaler configured to digitally adjust the selected first digital amplitude to reduce the selected second digital amplitude.

25. The WDS of claim 24, wherein a selected remote unit among the plurality of remote units comprises:
a plurality of radio frequency (RF) circuits configured to receive and amplify a plurality of RF communications signals, respectively;
signal conversion circuitry comprising a plurality of RF signal inputs and a digital signal output, the signal conversion circuitry configured to:
receive the plurality of RF communications signals via the plurality of RF signal inputs, respectively; and
generate a combined digital communications signal having a respective digital amplitude based on the plurality of RF communications signals; and
a remote unit controller coupled to the digital signal output, the remote unit controller configured to:
perform spectrum analysis on the combined digital communications signal to generate a remote unit spectrum analysis report;
generate a remote unit feedback signal comprising the remote unit spectrum analysis report; and
provide the remote unit feedback signal to the HEU over a selected communications medium among the plurality of communications mediums.

26. The WDS of claim 25, wherein the control circuitry is further configured to:
receive the remote unit feedback signal comprising the remote unit spectrum analysis report; and
determine that the selected second digital communications signal has the selected second digital amplitude exceeding the full-scale digital amplitude represented by the predefined number of binary bits based on the spectrum analysis report and the remote unit spectrum analysis report.

27. The WDS of claim 26, wherein the control circuitry is further configured to:
determine that the combined digital communications signal is received from the selected remote unit causing the selected second digital amplitude to approach the full-scale digital amplitude based on the remote unit spectrum analysis report; and
control the selected remote unit to adjust the respective digital amplitude of the combined digital communications signal to reduce the selected second digital amplitude.

28. The WDS of claim 23, wherein the HEU is coupled to the plurality of remote units via a plurality of optical fiber communications mediums, respectively, wherein:
the HEU is further configured to:
receive a plurality of radio frequency (RF) downlink communications signals;
convert the plurality of RF downlink communications signals into a plurality of optical downlink communications signals, respectively;
distribute the plurality of optical downlink communications signals to the plurality of remote units via the plurality of optical fiber communications mediums, respectively;
receive a plurality of optical uplink communications signals from the plurality of remote units via the plurality of optical fiber communications mediums, respectively; and
convert the plurality of optical uplink communications signals into a plurality of RF uplink communications signals, respectively; and
the plurality of remote units is further configured to:
receive the plurality of optical downlink communications signals via the plurality of optical fiber communications mediums, respectively;
convert the plurality of optical downlink communications signals into the plurality of RF downlink communications signals, respectively; and
receive the plurality of RF uplink communications signals;
convert the plurality of RF uplink communications signals into the plurality of optical uplink communications signals, respectively; and
provide the plurality of optical uplink communications signals to the HEU via the plurality of optical fiber communications mediums, respectively.

* * * * *